Jan. 1, 1963 H. G. LEUPOLD 3,071,665
DIFFERENTIAL TEMPERATURE CONTROLLER
Filed Nov. 2, 1959
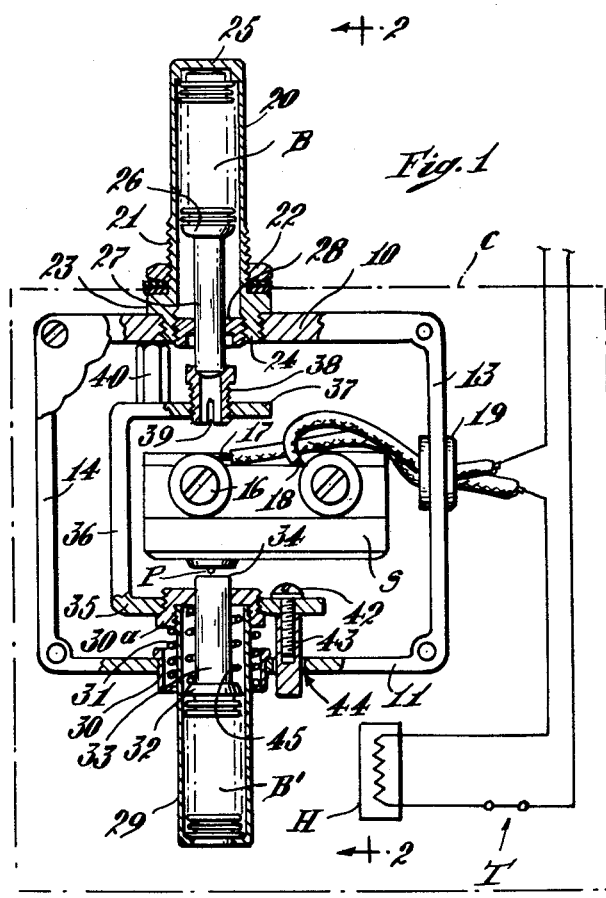
INVENTOR.
Henry G. Leupold
BY
ATT'YS // 3,071,665
Patented Jan. 1, 1963

3,071,665
DIFFERENTIAL TEMPERATURE CONTROLLER
Henry G. Leupold, Arlington, Mass., assignor to United Electric Controls Company, Watertown, Mass., a corporation of Massachusetts
Filed Nov. 2, 1959, Ser. No. 850,270
9 Claims. (Cl. 200—122)

This invention pertains to a temperature controller, more especially to one of the differential type, and particularly to a device designed to maintain, in an unsaturated condition, the air surrounding equipment which is subject to corrosion from exposure to condensed moisture so as to avoid the deposit of droplets of water upon such equipment.

For specific example, such equipment may be an air or oil filled capacitor, transformer or circuit breaker of the kind customarily employed by utility companies and which is customarily located in out-of-door situations where it is protected only by a metallic shell or other type of enclosure. In such a situation the condensation of moisture may be prevented by maintaining the temperature within the enclosure above the dew point, and it has been proposed to provide electrical heating coils or the like for warming the air within the enclosure in which the apparatus is housed. However, since the outside atmosphere may vary through a wide range, not only in temperature, but also in moisture content, it is not sufficient, under ordinary circumstances, to control the temperature within the enclosure in response to a simple thermostat.

The present invention has for one of its objects the provision of a control device operative automatically to regulate the heat supply to the interior of the enclosure which houses the apparatus to be protected, and which is sensitively and differentially responsive to the temperature within the enclosure and also to the atmospheric temperature outside the enclosure.

A further object is to provide a control device so devised as to maintain the temperature within the enclosure within a definite predetermined range, and with means whereby said range may be adjusted as desired.

A further object is to provide a control device which may be adjusted to maintain a minimum temperature within the enclosure regardless of lower temperatures outside of the enclosure.

A further object is to provide a control device of simple construction which occupies but little space and which is durable in its construction and relatively low in cost of production.

Other and further objects and advantages of the invention will be pointed out in the following more detailed description, wherein, FIG. 1 is a front elevation of the device with parts in vertical section, the instrument being shown as installed in an enclosure (indicated by broken lines) and suitably connected into a heater circuit;

FIG. 2 is a vertical section on the line 2—2 of FIG. 1; and

FIG. 3 is a front elevation, similar to FIG. 1, but illustrating a slight modification.

Referring to the drawings, the instrument enclosure is illustrated as a substantially rectangular box, comprising the top and bottom walls 10 and 11 respectively, the rear wall 12 and the side walls 13 and 14. This box may be a stamping or die casting, for example of metal, such as aluminum, or it may, if desired, be of molded plastic, and is provided with the removable front wall or cover 15. Within this box there is fixed a snap-action switch S which may be of conventional type, having an actuating pin P, and whose contacts are normally closed. The switch case is fixed within the instrument box by means of screws 16 passing through the switch case and through a spacer block M (FIG. 2), and into the rear wall 12 of the box. The lead wires 17 and 18, extending from the switch contacts, pass out through the side wall 13 of the box, desirably through an insulating grommet 19, and are connected to a heater circuit (FIG. 1) receiving current through suitable conduits from a supply. This circuit includes a coil or coils within the heater casing H, the circuit preferably being provided with a manually actuatable switch T, whereby the circuit may be broken when desired.

A bellows housing 20 is mounted upon the upper wall 10 of the instrument box, this bellows housing 20 being closed at its upper end and having an externally screw-threaded portion 21 designed to receive a nut 22, as hereinafter more fully described. Below this screw-threaded portion 21, the housing is enlarged radially, as shown at 23, and has a downwardly directed nipple portion 24, which is externally screw-threaded for engagement with screw threads provided in an opening in the upper wall 10 of the box. This opening is so located that the axis of the bellows housing 20 is coaxial with that of the switch pin P. Within the bellows housing 20 there is arranged a temperature responsive bellows B, to whose lower movable head 26 there is attached the upper end of a cylindrical plunger 27, which passes down through a guide opening in a collar 28, which is externally screw-threaded for engagement with internal screw threads of the nipple 24. The upper end of the bellows B engages the closed upper end 25 of the housing 20.

A second bellows housing 29 is arranged at the lower part of the instrument box, the housing 29 passing upwardly through a central opening in the bottom of a shallow cup-like guide bushing 30, which is arranged within an opening in the lower wall 11 of the box and suspended from said wall, the opening in the bottom of the bushing being of a diameter to receive the bellows housing with a sliding fit, the bushing 30 being of a diameter such as to provide a ledge, surrounding its central opening, for the reception of a stiff coil spring 31, whose purpose will hereinafter be described.

The bellows $B^1$, within the housing 29, has the movable upper head 32 from which projects the plunger 33, whose upper end 34 is disposed immediately below the switch pin P. The upper part of the plunger 33 is disposed in a central opening in an inverted shallow cup-like bushing 30a, which is internally screw-threaded for the reception of the externally screw-threaded upper end of the housing 29. The bushing 30a is externally screw-threaded for engagement with a screw-threaded opening in the lower arm 35 of a rigid U-shaped translationally movable yoke member 36, having the upper arm 37, the arms 35 and 37 being parallel and located, respectively, below and above the switch case S. The upper arm 37, of the yoke member, has a screw-threaded opening which receives an externally screw-threaded sleeve 38, preferably having an annular socket at its upper end for the reception of the lower end of the plunger 28 of the bellows B. Desirably, the member 38 is split, as shown at 39, so that when rotated to adjusted position it will retain its adjustment. The member 38 constitutes the means for adjusting the system differential of the instrument. The upper arm 37, of the yoke member, also carries a stop member 40 which, at times, may engage the inner surface of the upper wall 10 of the box, thereby positively limiting upward motion of the yoke. In order to prevent the yoke member from turning about the axis of the plunger 33, for example, the lower arm 35 is provided with an opening for the reception of a screw 42, which has threaded engagement with an axial bore in a guide plunger 43, which passes, with clearance, down through an opening 44 in the lower wall 11 of the instrument box. A light coil spring 45, within the housing of bellows B¹, is arranged to bear at its lower end against the movable head 32 of the bellows and at its upper end against the underside of the bushing 30a. This spring adds to the normal resistance of the bellows B¹ to expansion.

Referring to FIG. 1 the character C, indicates a portion of the wall of the enclosure for the apparatus to be protected. This wall has an opening for the passage of the bellows housing 20 and, in assembling the instrument box of the present invention with the wall C of the enclosure, (assuming that the nut 22 has first been removed) a resilient washer is first slipped over the upper part of the housing 20 until it rests upon the part 23 and then the housing 20 is passed upwardly through the hole in the wall C of the enclosure; a second resilient washer is then slipped down over the housing 20; and then the nut 22 is assembled with the housing 20 and screwed down to compress the washers upon opposite sides of the wall C, thus holding the instrument box firmly in leak-tight contact with the wall C. It is assumed that the heater H has been installed at a desirable location within the protective enclosure for the apparatus, and that the heater has been connected up, as diagrammatically indicated in FIG. 1, to a source of current.

With reference to the operation of the device, it may first be assumed that the switch S is normally closed, but that the circuit through the switch is broken when the pin P is pushed upwardly to a predetermined amount. It may further be assumed that the switch is of a type such that it will respond to a change of 5° in temperature, as determined by the relative motion of the plunger 33 and the switch pin. It may further be assumed that the adjusting member 38 has been turned for adjusting the system to a differential of 15°, it being noted that this adjusting member 38 is of a length and screw pitch such that the differential may be adjusted, for example, between values of 5° and 20°.

The member 40 is a low temperature stop and may be so designed or adjusted as to contact the inner surface of the top wall 10 of the instrument box when the inside atmospheric temperature drops to 40°. It may be understood that the part 40 may be of a fixed predetermined length corresponding to a definite temperature, or that it may be of adjustable character, for example having screw-threaded connection (not shown) with the arm 37, so that its effective length may be varied. With this arrangement it will be understood that the housing 20 of the bellows B is exposed to the outside atmosphere while the bellows B¹ is exposed to the atmosphere within the enclosure for the apparatus to be protected.

It may now be assumed, for specific example, that the switch T is open; that the screw 38 has been adjusted to a 15° F. differential; that the low temperature stop 40 has been set to a temperature of 40° F.; and that the atmospheric temperature outside the box and the temperature inside the box are both at 60° F. and that the surface 34 of the plunger 33 is slightly spaced from the lower end of the switch pin P, or at least has not elevated the switch pin to the switch opening position. If now the manual switch T be closed, the heater H immediately comes into action and will raise the temperature within the enclosure C until the temperature reaches 75° F. At this time, the upper end of the plunger 33 will have made contact with the pin P and will have raised the latter until the switch contacts open, thus cutting out the heater. The temperature within the enclosure C will now gradually drop until at 70° the bellows B¹ will have contracted sufficiently to allow the switch pin P to move downwardly to switch-closing position and the heater will again come into action. Assuming that the outside temperature still remains at 60°, the cycle will be repeated with the temperature within the enclosure C varying between 70° and 75°. Assume now that the temperature outside the enclosure drops to 50°, the bellows B will contract and allow the spring 31 to raise the yoke arm 35, thus changing the relation of the upper end of the plunger 34 and the switch pin. Since the differential established by the setting of the screw 38 is still 15°, the maximum temperature within the enclosure C will now be 65°. When the temperature in the enclosure drops to 60° the bellows B¹ will have contracted so as to lower plunger 33 to close the switch S and thus the temperature within the enclosure C will vary between 60° and 65° until the outside temperature again changes. If now, for example, the temperature outside of the enclosure should drop to 25°, or below, and assuming that the stop pin 40 has been arranged for a maximum of 40° inside temperature, no amount of contraction of the bellows B will result in an upward movement of the yoke 36 to an amount corresponding to more than 40° inside temperature. Thus, 40° will be the maximum temperature within the enclosure C, dropping, as the heater goes off, to 35° and varying between 35 and 40° until the outside temperature again rises above 25°. The stop 40 is useful in order positively to prevent the temperature within the enclosure C from dropping below a predetermined point as is necessary in certain installations such, for example, as when the apparatus is an oil filled capacitor or requires lubrication oil and it is necessary to prevent the oil from becoming abnormally viscous.

FIG. 3 illustrates a modified arrangement such that the controller may be mounted at the outside of the enclosure, for example where space within the enclosure is limited. In FIG. 3, parts similar to those shown in FIG. 1 and FIG. 2 have the same identifying numerals. In the device of FIG. 3, the bushing 30 of FIG. 1 is replaced by a bushing 30m whose upper end is screw-threaded for engagement with a threaded hole in the bottom wall 11 of the controller box. Below this screw-threaded upper portion, the bushing is enlarged in diameter to provide a limiting shoulder, and is then again reduced in diameter to provide a shoulder at 50 and an elongate tail portion 51 designed to pass through an aperture in the wall of the enclosure. Packing washers 52 are threaded over this tail portion, the wall of the enclosure (not shown) being between these washers when the controller is in position of use. The tail portion 51 is externally screw-threaded for the reception of the clamping nut 54.

In this arrangement, the thick top wall 10 of the box is provided with a screw-threaded opening Z to receive a fitting (not shown) through which the electrical conductors 17 and 18 pass.

While certain desirable embodiments of the invention have herein been disclosed by way of example, it is to be understood that the invention is broadly inclusive of all modifications falling within the scope of the appended claims.

I claim:

1. In combination, in a temperature controller, a first temperature-responsive device exposed, when the controller is in use, to atmospheric temperature, said device comprising a movable actuating element and being fixed in position, a second temperature-responsive device aligned with said device and, exposed when the controller is in use, to the temperature within an enclosure, said second device also having an actuating element, and being mounted for bodily movement upon a movable carrier, a snap-action switch having an operating pin arranged for actuation by the last-named actuating element, the actuating element of the first temperature-responsive device being operative to translationally move the carrier in response to variations in atmospheric temperature.

2. A differential controller for controlling the temperature within an enclosure, said controller including a thermally-responsive device having a housing designed to be exposed to the temperature subsisting outside of the enclosure, a second temperature-responsive device aligned with said device and having a housing designed to be exposed to the temperature which subsists within the enclosure, each of said devices comprising a movable part whose position varies with the temperature, a normally closed switch of the snap-action type having an actuating pin and whose terminals are designed to be connected, by conductors, into an electrical circuit which supplies current to a heater within the enclosure, a movable support for the housing of that temperature-responsive device which is within the enclosure when the controller is in use, the housing of the temperature-responsive device, which is exposed to the outside atmosphere, being fixed and immovable, the movable part of the second temperature-responsive device being opposed to the end of the switch-actuating pin and being movable toward and from the latter in response to temperature variations within the enclosure, and the movable part of the external temperature-responsive device being arranged to translationally move said movable support in response to changes in the temperature outside of the enclosure.

3. A differential temperature controller for controlling the temperature within an enclosure, comprising, in combination, a thermally-responsive device which is sensitively responsive to variations in the temperature outside of the enclosure when the controller is installed in position for use, and which comprises a movable part exposed within the enclosure, a second thermally-responsive device aligned with said device and exposed to the temperature within the enclosure, and which comprises a movable part whose position varies with the temperature, a movable support for the internal thermally-responsive device, whereby the latter is supported for bodily movement toward and from the first-named thermally-responsive device, a spring urging said support toward the first-named temperature-responsive device, a normally closed snap-action switch mounted upon a fixed support, with the exposed end of its actuating pin opposed to the movable part of the temperature-responsive device which is within the enclosure, the movable support carrying an abutment element which is in contact with the movable part of the external temperature-responsive device, said abutment element being adjustable with reference to the support, the switch having terminals to which conductors may be attached for connecting it into an electrical circuit supplying current to a heater within the enclosure.

4. In combination, in a differential temperature controlling device operative to maintain the temperature within an enclosure above the dew point regardless of atmospheric conditions outside of the enclosure, a box having walls defining an interior chamber, means whereby the box may be supported within the enclosure, two coaxial bellows housings, a thermally-responsive bellows within each respective housing, each bellows having a movable head, an elongate plunger attached at one end to the head of each respective bellows, the plungers being axially aligned and with their free ends spaced apart and within the box, the first of said bellows housings being fixed within an aperture in one wall of the box and with its major portion exposed outside of the box, a translationally movable carrier within the enclosure to which the second of said bellows housings is attached, the carrier having an abutment element which is held in firm contact with the free end of the plunger of the first bellows by a spring, and a snap-action switch within the box having an actuating pin, which is opposed to the free end of the plunger of the second bellows, the abutment being adjustable to determine the initial position of the movable carrier.

5. A temperature control device of the differential type for use in preventing the deposit of moisture on parts housed in a protective enclosure, one wall of which has an opening, a cylindrical bellows housing, means whereby one end of said housing may be fixed in said opening in the enclosure wall, the major portion of the bellows housing then being outside of the enclosure, a bellows in said housing comprising a movable head, and a plunger fixed at one end to the head, and which extends into the enclosure, a second bellows housing having therein a bellows, coaxial with the first and having a movable head to which one end of a plunger is fixed, said second bellows housing being within the enclosure when the device is in use, a normally closed snap-action switch, a fixed support upon which the switch is mounted, the switch having an actuating pin whose free end is coaxial with, and opposed to the free end of the plunger carried by the bellows which is within the enclosure, a translationally movable frame to which the last-named bellows housing is attached, said frame carrying an abutment for contact with the free end of the plunger of the external bellows housing, and a spring urging the frame in a direction such as to keep the abutment in contact with said plunger, the switch having terminals to which conductors may be attached for connecting the switch into the circuit of a heater within the enclosure.

6. A temperature control device operable to maintain a predetermined differential temperature between the interior and exterior of an enclosure provided with an electrical heater, said device comprising a rigid box defining a chamber having opposed parallel walls, a normally closed snap-action switch, having an actuating pin, fixed within said chamber approximately midway between said walls and with the axis of the actuating pin perpendicular to said walls, the switch having terminals to which conductors may be attached for connecting it into an electrical circuit supplying current to the heater, each of the said walls having an aperture coaxial with said pin, a rigid yoke member within said chamber, the yoke member being movable in a direction perpendicular to said walls and having arms which are located at opposite sides respectively of the switch, means for supporting the box of the control device at the inner side of a wall of the enclosure and with an aperture in one of said walls of the box registering with an opening in the wall of the enclosure, a thermally-sensitive bellows located outside of the box, said bellows having a movable head and a plunger fixed at one end to said head and which, when the control device is in use, extends through the opening in the enclosure wall and into the box of the control device, a cylindrical bellows housing coaxial with said plunger and which is slidable within an aperture in the other wall of the box of the control device, a bellows within said bellows housing which is exposed, when the control device is in use, to the temperature prevailing within the enclosure and which has a movable head to which one end of a plunger is fixed, the opposite end of the latter plunger being opposed to the free end of the switch pin, means connecting the inner end of said bellows housing to that arm of the yoke which is adjacent to the switch pin, an abutment member carried by the opposite arm of the yoke, providing a socket for the reception of the exposed end of the plunger of the first-named bellows, and a spring which urges the yoke in a direction such as to keep said plunger seated in the socket.

7. A control device according to claim 6, wherein the abutment member is adjustable relatively to the plunger thereby to set the instrument to a desired temperature differential.

8. A control device according to claim 6, comprising a limiting stop to determine the maximum motion of the yoke toward the bellows which is exposed to the outside atmosphere, thereby to determine the minimum temperature which may exist within the enclosure.

9. A temperature control device operative to maintain a predetermined differential temperature between the interior and exterior of the enclosure provided with a heater, said device comprising a rigid box, means for supporting the box within the enclosure, the box defining a chamber having upper and lower walls, a normally closed switch of the snap-action type, having an actuating pin, fixed within said chamber, the axis of the pin being perpendicular to the lower wall of the box, a rigid, vertically movable yoke member within said chamber, said yoke member being provided with parallel arms, one of which is above the switch and the other below the switch, a spring tending to elevate the yoke member, thereby to move its lower arm upwardly toward the switch pin, a bellows housing having its upper end fixed to the lower arm of the yoke member, and whose lower portion is slidable through an opening in the bottom wall of the box, a bellows within said bellows housing having a movable head which moves upwardly in response to temperature increase within the enclosure, a plunger fixed to said head and whose upper end is immediately below the lower end of the switch pin, a second bellows housing having its lower end fixed within an opening in the upper wall of the box, and which projects outwardly through an opening in the wall of the enclosure when the control device is installed for use, a bellows within said latter bellows housing having a movable head which moves upwardly in response to decrease in temperature outside of the enclosure, a plunger fixed to said movable head and which extends downwardly through an opening in the wall of the enclosure, when the control device is installed for use, and through an aperture in the upper wall of the box, a vertically adjustable abutment member carried by the upper arm of the yoke and which is disposed immediately below the lower end of the last-named plunger, and a spring which urges the yoke member upwardly to keep said abutment in contact with the plunger, and a limiting stop carried by the upper arm of the yoke member and which, by contact with the upper wall of the box limits upward motion of the yoke member.

References Cited in the file of this patent
UNITED STATES PATENTS

| | | |
|---|---|---|
| 2,116,802 | Shivers | May 10, 1938 |
| 2,153,297 | Butler | Apr. 4, 1939 |
| 2,235,692 | Timmis | Mar. 18, 1941 |
| 2,298,151 | Oplinger | Oct. 6, 1942 |
| 2,395,007 | Leupold | Feb. 19, 1946 |
| 2,431,801 | Gibson | Dec. 2, 1947 |
| 2,583,547 | Cox | Jan. 29, 1952 |
| 2,595,846 | Hall et al. | May 6, 1952 |
| 2,991,342 | Weber et al. | July 4, 1961 |